United States Patent [19]

Ishikawa

[11] Patent Number: 4,965,610

[45] Date of Patent: Oct. 23, 1990

[54] INK-JET RECORDING METHOD

[75] Inventor: Takatoshi Ishikawa, Furukawa, Japan

[73] Assignee: Alps Electric Co., Ltd., Tokyo, Japan

[21] Appl. No.: 399,655

[22] Filed: Aug. 28, 1989

[30] Foreign Application Priority Data

Aug. 29, 1988 [JP] Japan ................................ 63-214638

[51] Int. Cl.[5] .......................... G01D 15/16; B41J 3/04

[52] U.S. Cl. ................................ 346/1.1; 346/140 R

[58] Field of Search ................................ 346/140, 1.1

[56] References Cited

U.S. PATENT DOCUMENTS 4,162,502 7/1979 Cielo .................................. 346/140

4,410,899 10/1983 Haruta ................................ 346/1.1

4,752,782 6/1988 Saito .................................... 346/1.1

OTHER PUBLICATIONS

Ross R. Allen et al. "Thermodynamics and Hydrodynamics of Thermal Ink Jets", May 1985, Hewlett-Packard Journal, pp. 21-26.

*Primary Examiner*—Joseph W. Hartary

*Attorney, Agent, or Firm*—Guy W. Shoup; Paul J. Winters

[57] ABSTRACT

An ink-jet recording method where the heat emitting body is always maintained at a temperature higher than the ink vaporization temperature and where ink is transported onto the heat emitting body only at the time of printing. The printing speed of the ink-jet printer realized is controlled not by the heat response speed of the heat emitting body but by the speed at which ink can be moved.

Further, the ink-jet recording method can control the rate at which ink is ejected onto the recording paper by controlling the rate at which ink is transported onto the heat emitting body. Therefore, the intensity of printing can be controlled.

1 Claim, 2 Drawing Sheets

INK-JET RECORDING METHOD

BACKGROUND OF THE INVENTION

1. Field of the Invention

This invention relates to an ink-jet recording method to be applied to a printing apparatus such as a printer or a copying machine.

2. Prior Art

Bubble ink-jet recording method is known as one of a variety of the ink-jet recording methods.

FIG. 6 of the accompanying drawings illustrates a printer head assembly described by prior art applying the bubble ink-jet recording method, wherein reference numeral 1 denotes a cover plate and reference numeral 2 denotes a substrate. An ink flow channel 3 is formed between the cover plate 1 and the substrate 2. A heat emitting body 4 is formed on the inner surface of the substrate 2 and electrodes 5 and 6 are physically and electrically connected with the heat emitting body 4. The electrodes 5 and 6 and the heat emitting body 4 are covered with a protective film 7. A nozzle 8 is formed in said cover plate 1 and located directly above the heat emitting body 4.

As shown in FIGS. 7 through 11, a printing operation using a printer head assembly as described above starts by feeding ink into the ink flow channel 3. The pulse voltage is applied to the heat emitting body 4 for printing. As voltage is applied to the heat emitting body 4, its temperature rises. Eventually ink is vaporized from the surface of the heat emitting body 4 forming bubbles 9, which eject ink from the nozzle 8. The ejected ink reaches and tints the recording paper for printing.

PROBLEMS TO BE SOLVED BY THE INVENTION

A drawback of the conventional bubble ink-jet recording method is that the printing speed is restricted by the heat response speed of the heat emitting body 4 and therefore can not exceed a maximum frequency of approximately 40 Hz.

More specifically, a heat emitting body of a printer head assembly employing the conventional bubble ink-jet recording method is so designed that, as a pulse voltage is applied, its temperature rises rapidly to exceed the ink vaporization temperature ($T_2$) and reaches a peak temperature (Tp) and falls thereafter as illustrated in FIG. 12. In FIG. 12, area A shown above the ink vaporization temperature (Tp) represents the amount of energy used to vaporize ink and form ink bubbles. In order for this method to perform stable printing, the area A of the ink bubbling condition should be kept constant, i.e., the energy used to form each bubble should be the same. This in turn requires that the heat emitting body be cooled after each heating to a temperature which is identical with its temperature prior to the application of voltage. Since the cooling operation takes a certain period of time, the frequency of heating inevitably encounters a limit, which hinders attempts to improve printing speed.

OBJECT OF THE INVENTION

It is therefore the object of the present invention to provide a bubble ink-jet recording method that allows high speed printing.

SUMMARY OF THE INVENTION

The above object is achieved by providing a bubble ink-jet printing method, wherein a heat emitting body is always maintained at a temperature higher than the ink vaporization temperature and ink is transported onto the heat emitting body only at the time of printing.

While a piezo-electric device may be utilized for transporting ink onto the heat emitting body, static attractive force is preferably used as a means for ink transportation More specifically, ink is charged with positive or negative electricity and an electrode located opposite to the ink with interposition of a heat emitting body therebetween is charged with electricity having an opposite polarity so that the ink is attracted to move onto the heat emitting body.

Since the heat emitting body is always maintained at a temperature which is higher than the ink vaporization temperature once ink is transported onto the heat emitting body, the ink which is moved onto the heat emitting body immediately starts vaporizing to flash onto the recording paper.

DETAILED DESCRIPTION OF THE INVENTION

Figure 1:
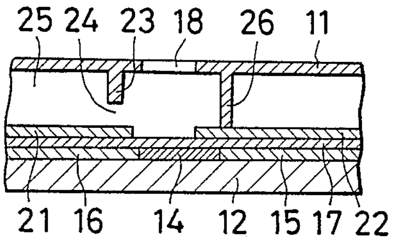
FIG. 1 is a sectional view of a printer head assembly employing the ink-jet recording method according to the invention.

In FIG. 1 which illustrates a printer head assembly employing the recording method according to the invention, reference numeral 11 denotes a cover plate and reference numeral 12 denotes a substrate. A heat emitting body 14 and electrodes 15, 16 which are electrically and physically connected with the heat emitting body 14 are installed on the inner surface of the substrate 12. The heat emitting body 14 as well as the electrodes 15, 16 are covered by a protective film 17. On the protective film 17, there are provided a separate electrode 21 and a common electrode 22 in juxtaposition with the heat emitting body 14 located therebetween.

Said cover plate 11 comprises a nozzle 18 formed directly above said heat emitting body 14. At a side of the nozzle 18, a partition 23 is formed on the inner surface of the cover plate 11, projecting toward the substrate 12. An ink outlet 24 is formed between the end of the partition 23 and the substrate 12. The space defined by the partition 23, and the substrate 12 and the cover plate 11 provides an ink chamber 25. At a side of the nozzle 18 opposite to the partition 23, there is provided a closure plate 26 standing on the inner surface of the cover plate 11 and reaching the substrate 12. Said closure plate 26 is airtightly connected with the substrate 12. An end portion of said common electrode 22 is projecting from the closure plate 26 toward the heat emitting body 14.

A printer head assembly employing the recording method according to the invention as described above functions in the following manner.

Figure 2:
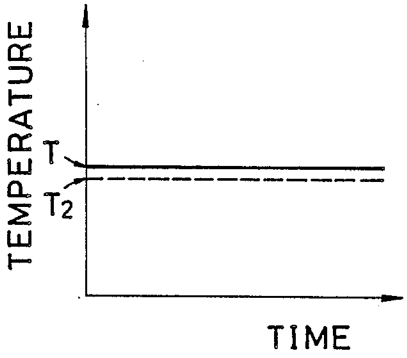
FIG. 2 is a graphic illustration showing temperature change of the heat emitting body of the printer head assembly of FIG. 1.
Figure 3:
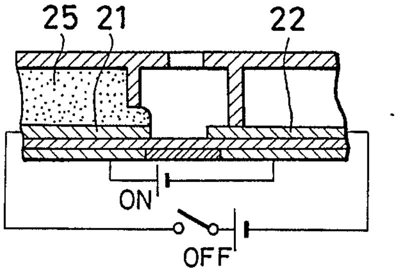
FIGS. 3 through 5 are sectional views of the printer head assembly of FIG. 1 showing different stages of the recording process.
Figure 4:
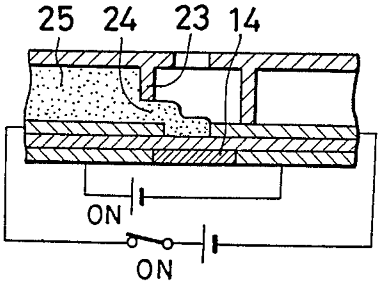
Figure 5:
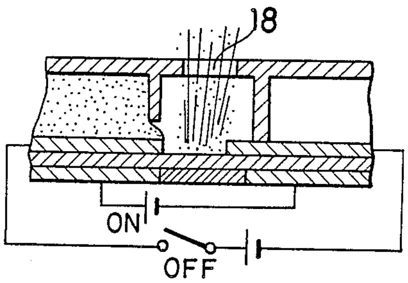
Figure 6:
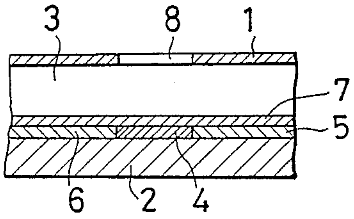
FIG.6 (PRIOR ART)
FIG. 6 is a sectional view of a printer head assembly employing an ink-jet recording method of prior art.
Figure 10:
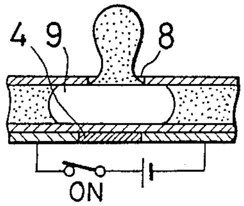
FIG.10 (PRIOR ART)
FIGS. 7 through 11 are sectional views of the printer head assembly of FIG. 6, showing different stages of the printing process.
Figure 7:
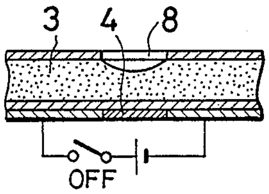
FIG.7 (PRIOR ART)
Figure 11:
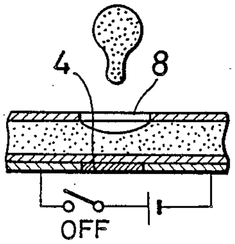
FIG.11 (PRIOR ART)
Figure 8:
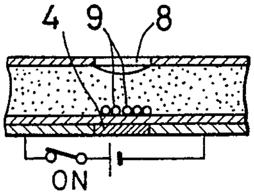
FIG.8 (PRIOR ART)
Figure 12:
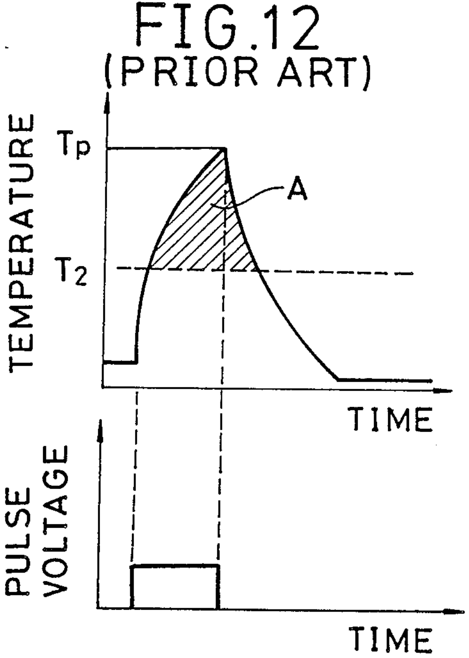
FIG.12 (PRIOR ART)
FIG. 12 is a graphic illustration showing temperature change of the heat emitting body of the printer head assembly of FIG. 6.
Figure 9:
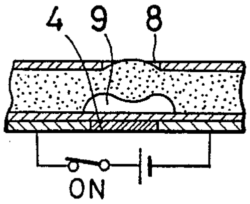
FIG.9 (PRIOR ART)

First, voltage is constantly applied to the heat emitting body 14 by the electrodes 15, 16 so that the temperature (T) of the heat emitting body 14 is maintained at a level slightly higher than that of the ink vaporization temperature $T_2$ as illustrated in FIG. 2. The ink chamber 25 of the printer head assembly is filled with ink (FIG. 3). Under these conditions, once voltage is applied between the separate electrode 21 and the common electrode 22, the ink found on the separate electrode 21 in the ink chamber 25 is attracted by the common electrode 22. Then as shown in FIG. 4, the ink in the ink chamber 25 flows out through the ink outlet 24 and reaches the heat emitting body 14. Since the heat emitting body 14 is held at a high temperature, the ink which is moved onto the heat emitting body 14 immediately starts vaporizing and is then blown out of the nozzle 18 as a flash onto the recording paper. Consequently, the recording paper is tinted with ink in a number of dots.

Since the heat emitting body 14 is always maintained at a temperature higher than the ink vaporizing temperature and ink is moved onto the heat emitting body 14 for printing by means of static attractive force only at the time of printing according to the ink-jet recording method of the invention, the heat emitting body 14 requires no cooling operation and the printing speed is restricted only by the speed at which ink can be moved. Since the speed at which ink can move can be easily increased, the recording method according to the invention utilizing static attractive force can easily achieve frequencies up to 10 kHz, making the method good for high speed printing.

With this recording method, since the amount of ink which is moved onto the heat emitting body 14 can be controlled by the period of time during which electricity is supplied to the separate electrode 21 and common electrode 22, the amount of ink to be ejected from the nozzle 18 can easily be controlled. Therefore, this recording method is advantageous in easily controlling the intensity of printing.

EFFECTS OF THE INVENTION

As described above, since the ink-jet recording method according to the invention is characterized by the fact that the heat emitting body is always maintained at a temperature higher than the ink vaporizing temperature and ink is transported onto the heat emitting body of only at the time of printing, the printing speed is controlled not by the heat response speed of the heat emitting body but by the speed at which the ink can be moved. Consequently, high speed printing can be realized by the ink-jet recording method according to the invention.

Moreover, the ink-jet recording method according to the invention can control the rate of ink ejected onto the recording paper by controlling the rate of ink transportation onto the heat emitting body. Therefore, with the method of the invention, the intensity of printed ink can be controlled with ease.

What is claimed is:

1. An ink-jet recording method comprising:
   maintaining a heat emitting body at a temperature higher than the ink vaporizing temperature; and
   transporting the ink onto the heat emitting body only at the time of printing.

* * * * *